3,394,013
FLAVORED FATTY MATERIAL AND PROCESS FOR PREPARING THE SAME
Brinton Marlo Dirks and Gunther M. Nakel, Springfield Township, Ohio, assignors to The Procter & Gamble Company, Cincinnati, Ohio, a corporation of Ohio
No Drawing. Filed Nov. 2, 1964, Ser. No. 408,357
16 Claims. (Cl. 99—118)

ABSTRACT OF THE DISCLOSURE

Shortening having a yeasty or crusty flavor is produced by heating bland shortening together with a yeast-sugar ferment and then segregating the flavored shortening.

---

This invention relates to a process for preparing a flavored fatty material which can be used in the preparation of baked products such as bread, rolls, buns and the like. This invention further relates to the flavored fatty material prepared by this process.

The fatty material to be flavored by the process of this invention is a glyceride shortening composition, particularly liquid shortening. Such liquid shortening comprises at least one glyceride oil and normally contains a minor proportion of substantially completely saturated triglycerides. The glyceride oils can be derived from naturally occurring oil-bearing materials and include oils such as cottonseed oil, soybean oil, peanut oil, rapeseed oil, safflower oil, sesame seed oil, sunflower seed oil and wallflower seed oil. The substantially completely saturated triglycerides can be obtained by hydrogenating the above oils and animal fats such as tallow. A liquid shortening suitable for use in this invention is disclosed in Andre and Going U.S. Patent 2,815,286, granted Dec. 3, 1957.

In conventional glyceride oil processing, oils are generally extracted from vegetable materials by conventional pressing or solvent extraction procedures. The crude glyceride oils, extracted by these processes, contain nonglyceride impurities, such as for example, fatty acids and phosphatides. These impurities are normally partly removed by alkali-refining and bleaching with such agents as bleaching earth, acid-activated clays and activated carbon. Since some of the impurities remaining in the glyceride oils after refining and bleaching are undesirable from a taste and odor standpoint, refined bleached oils which are to be used for edible purposes are normally deodorized by steam distillation to produce oils having substantially bland or neutral flavor. Since these bland oils are the major constituents of liquid shortenings and since any triglyceride ingredient is normally equally bland, liquid shortenings are ordinarily bland as well.

New methods or means by which the flavor of shortenings can be improved to meet with greater favor among users and consumers are constantly being sought.

It is therefore an object of this invention to provide a process for imparting to shortenings some of the flavors normally associated with baked products, particularly bread.

It is a further object of this invention to provide a shortening having a flavor normally associated with bread.

It has been found that shortening can be provided with a flavor normally associated with bread by a process comprising a fermenting step wherein flavor is developed; a contacting step wherein the flavor developed in the fermenting step is extracted with the shortening to be flavored or wherein the developed flavor is modified and this new flavor is extracted with the shortening to be flavored; and a separating step wherein the flavored shortening is segregated. The type and intensity of the flavor achieved by this process depends on the particular components of the composition fermented and on the duration of, and the temperature achieved during the contacting step as will hereafter be described in detail.

In the first step of the present process an aqueous nutrient medium comprising water, yeast and sugar is allowed to ferment in order to develop flavor.

A preferred yeast to be used in the preparation of this aqueous nutrient medium is baker's yeast (*Saccharomyces cerevisiae*). This yeast, which is ordinarily used in the production of bread, can be used in the form of compressed yeast, normally containing about 30% solids, or as active dry yeast, normally containing about 92% solids.

Other species of the genus Saccharomyces can also be employed as a yeast ingredient of the aqueous nutrient medium. These include, for example, *Saccharomyces carlbergensis*, *Saccharomyces fragilis*, *Saccharomyces mellis* and *Saccharomyces rouxii*. These yeasts or their cultures are commercially available.

Torula yeast (*Torulopsis utilis*) can also be used as the yeast ingredient for the nutrient medium. Preferably, the Torula yeast is grown on a medium which does not impart flavor to the yeast, such as sucrose, water and a nitrogen source such as yeast extract or protein hydrolysate. Torula yeast can also be grown on low cost material such as by-product sugar cane, molasses and waste sulfite liquor from wood pulping, but yeast so grown may contain woody or bitter notes and should be washed before use.

The sugar ingredient of the aqueous nutrient medium must be a yeast-fermentable sugar. The term "yeast-fermentable sugar" is used herein both to include sugars which are directly fermentable and sugars which are fermentable only after hydrolysis or inversion. Hydrolysis or inversion takes place in the presence of water and is catalyzed by enzymes (e.g., yeast invertase) and/or acids which are present in the aqueous nutrient medium.

The particular sugar which is used will depend at least in part on the particular yeast which is used since the above yeasts may not all ferment the same sugars. For example, all of the above yeasts directly ferment many hexoses, the most common of which are glucose, fructose and galactose. They also ferment sucrose after it has been inverted to glucose and fructose for example by yeast invertase. In addition, they ferment maltose after it has been hydrolyzed. *Saccharomyces fragilis* additionally hydrolyzes and ferments lactose. Torula yeast ferments many pentoses including, for example, ribose and xylose.

In addition to these essential components, that is, water, yeast and a yeast-fermentable sugar, other components can be added to the aqueous nutrient medium both before and after fermentation to intensify or slightly modify the flavor of the medium and thereby the flavor imparted to the shortening. These components will be enumerated and their roll explained after the rest of the basic process is described in detail.

Wide latitude is allowable in the relative amounts of water, yeast and yeast-fermentable sugar used in the preparation of the aqueous nutrient medium. Generally, the weight ratios of sugar to water range from about 1:20 to about 2:1 with from about 1:1 to about 1:2 preferred. The weight ratios of yeast solids to water range from about 1:75 to about 2:1 with from about 1:15 to about 1:25 preferred.

The large amount of water present if the weight ratio of sugar to water is less than about 1:20 or the weight ratio of yeast solids to water less than about 1:75 can necessitate an uneconomical water removal step before the contacting step of this invention or a very long contacting step, e.g., more than about four hours (with commercially-sized batches) in order to impart flavor. A maximum weight ratio of sugar to water of about 2:1 is critical to fermentation rate. If the weight ratio of sugar to water exceeds about 2:1, the fermentation reaction rate will be so slow that more than about 24 hours will be necessary for flavor to develop. The upper limit on the weight ratio of yeast solids to water, about 2:1, is chosen as an economic limit since yeast is the most expensive ingredient and weight ratios of over about 2:1 give no particular advantage.

Generally, fermentation times ranging from about five minutes to about 24 hours are useful herein. After the aqueous nutrient medium ferments for about five minutes, a yeasty flavor begins to appear in the medium and within about 24 hours all fermentation reactions have reached equilibrium. As used herein with respect to flavor, the term "yeasty" denotes the alcoholic, fusel oil, fruity notes reminiscent of fresh-baked, yeast-leavened bakery products.

A minimum fermentation temperature of at least about 75° F. is generally necessary in order for the fermentation reaction to be initiated and maintained. If the temperature of the aqueous nutrient medium is greater than about 105° F., the fermenting action of the yeast is impaired.

After the aqueous nutrient medium has been allowed to ferment for the period of time desired, it is brought into contact with the shortening to be flavored. Intimate contact between the shortening and medium is accomplished by virtue of water and volatile components evaporating and passing through the oil phase when heat is applied to the system as will be described hereinafter.

Alternatively, the water can be removed from the aqueous nutrient medium, for example, by freeze-drying and the resultant dry mixture brought into contact with the shortening. When the water has been removed, intimate and immediate contact between the flavor donating ingredients and the shortening can be achieved. Both the fermented aqueous nutrient medium and this medium with its water removed are referred to herein as "ferments."

The weight ratio of shortening to ferment (on a water-free basis) can range from about 1:2 to about 10:1. If the weight ratio of shortening to ferment does not exceed about 1:2, there is danger that the ferment may char during the contacting step as will hereafter be described and a burnt flavor imparted to the shortening. If the weight ratio of shortening to ferment exceeds about 10:1, the flavor imparted to the shortening during the contacting step will be very slight and not readily apparent.

The shortening extracts certain flavors from the ferment depending on the particular components of the ferment, the duration of the contacting step and the temperature achieved during contacting. Generally, the shortening is contacted with the ferment for from about ten minutes to about four hours and until a shortening-ferment system internal temperature ranging from about 130° F. to about 275° F. is achieved. The internal temperature is generally measured in the central portion of the system at temperature equilibrium. The temperature at any point in the system should always be less than the char temperature of the ferment.

The above internal temperatures can be achieved by heating either or both the shortening and ferment before initial contact. Alternatively, the shortening and ferment can be brought into contact and the system subjected to an ambient temperature, for example an oven temperature, ranging from about 300° F. to about 450° F.

A yeasty flavor is imparted to the shortening after an internal temperature of about 130° F. is achieved during contacting. As higher internal temperatures are achieved and the time of contacting and extraction extended, the yeasty flavor imparted to the shortening becomes more pronounced. Preferably for optimum yeasty flavor the shortening and ferment, initially at room temperature, are heated together at an ambient temperature of about 350° F. until an internal temperature of about 235° F. is achieved.

If the sugar in the ferment is a reducing sugar, a crusty flavor is imparted to the shortening by contacting the shortening and ferment until an internal temperature of at least about 240° F. is achieved. The term "crusty" is used herein to denote a flavor reminiscent of the crust of white bread, that is, nutty, cracker-like, slightly bitter and caramelized. Preferably, for a crusty flavor the shortening and ferment initially at room temperature are heated together at an ambient temperature of about 350° F. until an internal temperature of about 245° F. is achieved.

After the desired flavor has been imparted to the shortening in the contacting step, the shortening is segregated from the ferment, for example by decanting or filtering. The segregated shortening contains a small but effective amount of ferment extract, that is, flavoring components extracted during heating. This flavored shortening can be used immediately or allowed to cool to room temperature for use at a later time.

Turning now to the optional ingredients that can be added to the aqueous nutrient medium for special effects, there are a number of ingredients which result in intensifying the flavor imparted to the shortening during the contacting step. For example, alkaline buffering agents can be added to the aqueous nutrient medium to raise the pH of the medium from its natural pH of 4.5 to a range of 6.5 to 8 for optimum flavor strength. The flavor gains in strength but does not change in type as the pH is raised from 4.5 to the optimum range. Disodium phosphate is a preferred buffering agent. Other buffers useful for this same purpose include, for example, glycine and sodium bicarbonate.

Also, adding the shortening to be flavored to the aqueous nutrient medium before fermentation starts or during the course of fermentation rather than just prior to heating and flavor extraction intensifies the flavor imparted to the shortening.

Certain ingredients can be added to the aqueous nutrient medium to intensify the crusty flavor imparted to the shortening, if such flavor is desired. For example, wheat flour or hydrolyzed vegetable proteins can be added to the aqueous nutrient medium to supply alpha-amino acids, which participate in Maillard browning reactions, together with a reducing sugar to aid in the production of a crusty flavor.

Other ingredients can be added to the aqueous nutrient medium to change the type of flavor imparted to the shortening. For example, non-fat dried milk solids, such as spray-dried skim milk or spray-dried whey, can be added to the aqueous nutrient medium to add a creamy note, that is, a flavor reminiscent of fresh butter, to the yeasty or crusty flavor ordinarily imparted. The addition of rye flour to the aqueous nutrient medium imparts to the shortening a sour, acidic note such as that characteristic of rye bread. Malt can be used to supply its characteristic note.

Besides these optional ingredients it will be understood by those skilled in the art that other ingredients normally used in bread preparation can be used for specific effect. For example, whole wheat and corn flours, cocoa, salt and spices can be added to the aqueous nutrient medium to supply their characteristic notes.

The amount of the optional ingredient which is to be added to the aqueous nutrient medium to modify the resulting flavor may be widely varied depending on the specific effect desired. In general, the greater the proportion of optional ingredient, the more its characteristic flavor is emphasized. Usually, the optional flavor ingredients comprise no more than 50% by weight of the aqueous nutrient medium so as not to mask the basic yeasty or crusty note.

The following examples are illustrative of the present invention and are not to be construed in any way as limiting the scope of the invention.

Example I

Twenty-five gms. granulated sucrose is dissolved in 25 gms. distilled water in a beaker. Twenty gms. crumbled compressed bakers' year (*Saccharomyces cerevisiae*) is added with stirring to form an aqueous nutrient medium. The weight ratio of sugar to water in the medium is about 1:1.6 and the weight ratio of yeast solids to water in the medium is about 1:6.5.

The above-formed medium is allowed to ferment for 1.3 hours at 90° F. The pH of the ferment is 4.5.

The ferment is added with stirring to a beaker containing 100 gms. of an all-soybean oil liquid shortening which has an I.V. of about 100 and which is normally used in the preparation of baked products. The weight ratio of shortening to ferment (on a water-free basis) is about 3.2:1.

The shortening-ferment system is subjected to an ambient temperature of 350° F. in an electric oven. After about 55 minutes of heating an internal temperature of 235° F. is achieved. The heating is then stopped and the shortening decanted. The decanted shortening has a yeasty flavor.

In another case, a shortening-ferment system prepared in the above manner is heated at 350° F. for 75 minutes until an internal temperature of 245° F. is achieved. The decanted shortening has a crusty flavor.

Substantially equal results are obtained when *Saccharomyces carlsbergensis*, *Saccharomyces fragilis*, *Saccharomyces mellis*, *Saccharomyces rouxii* or *Torulopsis utilis* is substituted for the *Saccharomyces cerevisiae* above.

Example II

Seventy grams of ferment prepared as in Example I is placed on a stainless steel tray of a conventional freeze dryer to form a layer one-half inch in depth and thereafter is cooled to −15° F. The frozen ferment is then dried until substantially all of the water is removed by heating for eight hours at a plate temperature of 125° F. at 1 mm. Hg pressure or less.

The freeze-dried ferment is removed from the freeze dryer and is immediately added with stirring to a beaker containing 100 gms. of the liquid shortening of Example I. The weight ratio of shortening to ferment (on a water-free basis) is 3.2:1.

The shortening-ferment system is subjected to an ambient temperature of 350° F. in an electric oven. After about 15 minutes of heating an internal temperature of 235° F. is achieved. The decanted shortening has a yeasty flavor.

Example III

Sixteen gms. disodium phosphate and 50 gms. granulated sucrose are dissolved in 200 gms. distilled water in a beaker. Forty gms. crumbled compressed bakers' yeast (*Saccharomyes cerevisiae*), 50 gms. spring wheat flour and 200 gms. of the liquid shortening of Example I are added to this solution and the system mixed with a household blender at medium speed for 30 seconds to form an aqueous nutrient medium. The weight ratio of sugar to water in the medium is about 1:4.6 and the weight ratio of yeast solids to water in the medium is about 1:19. The weight ratio of shortening to ferment on a water-free basis is about 1.6:1.

The system is transferred to a beaker and fermented at 90° F. for 80 minutes. The pH of the ferment is 7.0.

The system is then subjected to an ambient temperature of 350° F. in an electric oven. After about two hours of heating an internal temperature of 235° F. is achieved. The heating is then stopped and the shortening decanted from the ferment. The decanted shortening has a yeasty flavor which is more intense than that of Example I.

Example IV

Fifty gms. glucose is dissolved in 50 gms. water in a beaker. Forty gms. crumbled compressed bakers' yeast (*Saccharomyces cerevisiae*), 50 gms. rye flour and 30 gms. dried whey solids are added with stirring to form an aqueous nutrient medium. The weight ratio of sugar to water in the medium is about 1:1.7 and the weight ratio of yeast solids to water in the medium is about 1:7.2.

The medium is fermented for 16 hours at 80° F. The pH of the ferment is 4.5.

Two hundred gms. of the liquid shortening of Example I is heated to 260° F. in a beaker in an electric oven at 350° F. The ferment at 80° F. is added to the hot shortening over a period of about five minutes. The weight ratio of shortening to ferment (on a water-free basis) is about 1.5:1.

The system is subjected to an ambient temperature of 350° F. in an electric oven. After about 30 minutes an internal temperature of 226° F. is achieved. The heating is then stopped and the shortening decanted. The shortening has a yeasty flavor; creamy and rye side notes are present.

In another case, a shortening ferment system prepared in the above manner is heated at 350° F. for 42 minutes until an internal temperature of 250° F. is achieved. The decanted shortening has a crusty flavor; creamy and rye side notes are present.

Example V

An aqueous nutrient medium is prepared and fermented as in Example I except that 5 gms. of wheat malt is additionally added to the aqueous nutrient medium.

The ferment is added with stirring to a beaker containing 100 gms. of the liquid shortening of Example I. The weight ratio of shortening to ferment (on a water-free basis) is about 2.8:1.

The system is subjected to an ambient temperature of 350° F. in an electric oven. After about 65 minutes of heating an internal temperature of 235° F. is achieved. The decanted shortening has a yeasty flavor; malt side notes are present.

Shortenings flavored by the process of this invention can be used in the preparation of bakery products, particularly bread.

Edible glyceride compositions other than the shortenings specifically described herein can be beneficially treated by the present process. For instance, a liquid shortening flavored as in the above examples can be used as a component of a plastic shortening and the yeasty or crusty or other related flavor thereby imparted to the plastic shortening. Plastic shortenings comprise at least one of the described glyceride oils and in addition normally contain from about 10% to about 20% of substantially completely saturated triglyceride. A plastic shortening composition suitable for flavoring by the process of this invention is disclosed in Coith, Richardson and Votaw U.S. Patent 2,132,393, granted Oct. 11, 1938.

What is claimed is:

1. A process for flavoring glyceride shortening compositions comprising the following steps:
   (A) fermenting an aqueous nutrient medium comprising water, a yeast and a yeast-fermentable sugar, the yeast being selected from the group consisting of yeasts of the genus *Saccharomyces* and *Torulopsis utilis*; wherein the weight ratio of sugar to water ranges from about 1:20 to about 2:1 and the weight ratio of yeast solids to water ranges from about 1:75 to about 2:1;
   (B) contacting a shortening in liquid form and the ferment resulting from A for from about ten minutes to about four hours and until an internal temperature ranging from about 130° F. to about 275° F. is achieved, the weight ratio of shortening to ferment ranging from about 1:2 to about 10:1 on a water-free basis; and (C) segregating flavored shortening from said ferment.

2. The process of claim 1 wherein prior to contacting, the shortening and ferment are at room temperature and during contacting are subjected to an ambient temperature ranging from about 300° F. to about 450° F.

3. The process of claim 1 wherein the yeast in the aqueous nutrient medium is *Saccharomyces cerevisiae*.

4. The process of claim 1 wherein the temperature of fermentation ranges from about 75° F. to about 105° F. and the time of fermentation ranges from about five minutes to about 24 hours.

5. The process of claim 1 wherein the weight ratio of sugar to water in the aqueous nutrient medium ranges from about 1:1 to about 1:2.

6. The process of claim 1 wherein the weight ratio of yeast solids to water in the aqueous nutrient medium ranges from about 1:15 to about 1:25.

7. The process of claim 1 wherein the water is removed from the fermented aqueous nutrient medium before it is contacted with the shortening.

8. A process for imparting a yeasty flavor to shortening comprising the following steps:
(A) fermenting an aqueous nutrient medium comprising water, *Saccharomyces cerevisiae* and a sugar fermentable by *Saccharomyces cerevisiae*; wherein the weight ratio of sugar to water ranges from about 1:20 to about 2:1 and the weight ratio of *Saccharomyces cerevisiae* to water ranges from about 1:75 to about 2:1;
(B) contacting a shortening with the ferment resulting from A for from about ten minutes to about four hours and until an internal temperature of about 235° F. is achieved to impart a yeasty flavor to said shortening; and
(C) decanting said flavored shortening from said ferment.

9. A process for imparting a crusty flavor to shortening comprising the following steps:

(A) fermenting an aqueous nutrient medium comprising water, *Saccharomyces cerevisiae* and a sugar fermentable by *Saccharomyces cerevisiae*; wherein the weight ratio of sugar to water ranges from about 1:20 to about 2:1 and the weight ratio of *Saccharomyces cerevisiae* to water ranges from about 1:75 to about 2:1;
(B) contacting a shortening with the ferment resulting from A for from about ten minutes to about four hours and until an internal temperature of about 245° F. is achieved to impart a crusty flavor to said shortening; and
(C) decanting said flavored shortening from said ferment.

10. The process of claim 1 wherein the aqueous nutrient medium contains additionally the shortening to be flavored and said shortening is a component of said medium during fermentation.

11. The process of claim 1 wherein the pH of the aqueous nutrient medium is adjusted to about 7.0 by addition of disodium phosphate.

12. The process of claim 1 wherein the aqueous nutrient medium contains additionally wheat flour.

13. The process of claim 1 wherein the aqueous nutrient medium contains additionally non-fat dried milk solids.

14. The process of claim 1 wherein the aqueous nutrient medium contains additionally rye flour.

15. The process of claim 1 wherein the aqueous nutrient medium contains additionally malt.

16. A shortening composition having a flavor normally associated with bread, said composition being produced by the process of claim 1.

References Cited
UNITED STATES PATENTS 2,172,531   9/1939   Ekhard _____ 99—122

MAURICE W. GREENSTEIN, *Primary Examiner.*